(12) United States Patent
Shin et al.

(10) Patent No.: US 9,857,549 B1
(45) Date of Patent: Jan. 2, 2018

(54) ROTATIONAL ACTUATOR FOR OPTICAL DEVICE AND CAMERA MODULE HAVING THE SAME

(71) Applicant: JAHWA electronics Co., Ltd., Chungcheongbuk-do (KR)

(72) Inventors: Doo Sik Shin, Gyeonggi-do (KR); Sang Chul Kim, Seoul (KR)

(73) Assignee: JAHWA ELECTRONICS CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 15/386,300

(22) Filed: Dec. 21, 2016

(30) Foreign Application Priority Data

Jul. 1, 2016 (KR) .......................... 10-2016-0083741

(51) Int. Cl.
| | |
|---|---|
| *H04N 5/225* | (2006.01) |
| *G02B 7/00* | (2006.01) |
| *G02B 5/20* | (2006.01) |
| *G06K 9/00* | (2006.01) |
| *H04N 5/33* | (2006.01) |
| *F03G 7/06* | (2006.01) |

(52) U.S. Cl.
CPC .............. *G02B 7/006* (2013.01); *F03G 7/065* (2013.01); *G02B 5/208* (2013.01); *G06K 9/00604* (2013.01); *H04N 5/2254* (2013.01); *H04N 5/33* (2013.01)

(58) Field of Classification Search
CPC ............................... G02B 7/006; H04N 5/2254
USPC .......................................................... 348/374
See application file for complete search history.

(56) References Cited

U.S. PATENT DOCUMENTS

| | | | | |
|---|---|---|---|---|
| 2012/0050896 A1* | 3/2012 | Nobe | ...................... | F03G 7/065 359/824 |
| 2013/0145760 A1* | 6/2013 | Gondo | .................... | F03G 7/065 60/528 |
| 2013/0162896 A1* | 6/2013 | Kang | ................... | G02B 27/646 348/374 |
| 2017/0289455 A1* | 10/2017 | Hu | ..................... | H04N 5/23287 |

FOREIGN PATENT DOCUMENTS

| | | |
|---|---|---|
| KR | 2002-0042004 A | 6/2002 |
| KR | 10-2006-0119077 A | 11/2006 |

\* cited by examiner

*Primary Examiner* — Usman Khan
(74) *Attorney, Agent, or Firm* — The PL Law Group, PLLC

(57) ABSTRACT

Disclosed is a rotational actuator for an optical device, which includes a rotary shaft capable of freely rotating at a fixed position; a first shape-memory alloy wire fixed in a first direction to give a rotation moment to the rotary shaft, the first shape-memory alloy wire making length contraction with respect to the rotary shaft when an electric current is applied thereto; a second shape-memory alloy wire fixed in a second direction opposite to the first direction to give a rotation moment with respect to the rotary shaft, the second shape-memory alloy wire making length contraction with respect to the rotary shaft when an electric current is applied thereto; and a control unit configured to supply an electric current to the first shape-memory alloy wire when rotating the rotary shaft in the first direction and supply an electric current to the second shape-memory alloy wire when rotating the rotary shaft in the second direction.

15 Claims, 6 Drawing Sheets

ROTATIONAL ACTUATOR FOR OPTICAL DEVICE AND CAMERA MODULE HAVING THE SAME

CROSS-REFERENCE TO RELATED APPLICATION AND CLAIM OF PRIORITY

The present application claims priority to Korean Patent Application No. 10-2016-0083741 filed on Jul. 1, 2016 in the Korea Intellectual Property Office, the disclosures of which are incorporated herein by reference.

BACKGROUND

1. Technical Field

The present disclosure relates to a rotational actuator for an optical device and a camera module having the same, and more particularly, to a rotational actuator for an optical device, which is integrally provided at a camera module mounted to a portable terminal but is capable of rotating without giving any serious influence on size and power consumption of the camera module, and a camera module having the same.

2. Background Art

Generally, a camera module for taking an image is basically loaded on a portable terminal (hereinafter, referred to as a "portable terminal") such as a cellular phone, a smart phone, a PDA or the like.

The camera module loaded on the portable terminal should have a very small design, and thus at early stages, the camera module has a deteriorated photographing function in comparison to general digital cameras. However, recently, along with continuous technical development, various functions such as autofocusing, optical zooming, optical image stabilization or the like have been added thereto so that a user may satisfactorily take images of daily lives every time.

Such an optical adjustment function is heavily indebted to the technical development of a small actuator which moves an optical element. In a camera module for a portable terminal, the small actuator technique is being developed in various ways for improving the performance of the actuator, improving a design to effectively dispose the small actuator in a narrow space, or the like.

Until now, the small actuator applied to a camera module is mostly classified into VCM (Voice Coil Motor) actuators and piezo-electric actuators. These actuators are capable of linearly moving a subject, because optical elements in the camera module are mostly operated to linearly move along an optical axis for focusing or move on a plane orthogonal to the optical axis for image stabilization.

Meanwhile, recently, security of personal information stored in the portable terminal has become a serious social issue. For security of a portable terminal, it is possible to use inherent biometric data of a user when the user accesses a home screen of the portable terminal, accesses personal information or makes a payment, in order to authenticate whether the user is a sincere user of the portable terminal.

As a user authentication device included in the portable terminal, there are generally used a voiceprint recognition device, a fingerprint recognition device, an iris recognition device or the like.

An iris recognition device applicable to a portable terminal is introduced in Korean Unexamined Patent Publication No. 2002-0042004 (published on Jun. 5, 2002), entitled "an authentication device using iris recognition". The iris recognition device applicable to a portable terminal as mentioned above basically includes an iris recognition chip for extracting iris codes from an iris image taken by a camera module mounted to the portable terminal to perform user registration or authentication.

However, an imaging device such as a charge-coupled device (CCD) and a complementary metal-oxide semiconductor (CMOS) applied to the camera module of the portable terminal responds to near-infrared ray or infrared ray with a wavelength of about 700 nm. However, the near-infrared ray or infrared ray causes crosstalk to the imaging device to weaken color reproduction of the imaging device and deteriorate a signal-to-noise ratio of the imaging device. Therefore, the camera module needs an infrared cutoff filter for blocking near-infrared ray or infrared ray.

Contrary to the above case where a general image is taken, when an image is taken for vein recognition, iris recognition or face recognition, the precision of recognition seriously deteriorates under a visible light, and thus an infrared light is required. However, since the camera module basically includes the infrared cutoff filter as described above, even though an infrared light is used, 90% or above of the infrared light is blocked by the infrared cutoff filter, thereby eliminating the effect of the infrared light. If the infrared cutoff filter is removed to solve this problem, an image may be taken under an infrared light, but the quality of a daylight image which is most ordinary and frequent should be sacrificed.

In order to solve this problem, Korean Unexamined Patent Publication No. 10-2006-0119077 (published on Nov. 24, 2006) discloses a 'portable communication terminal having an iris recognition function', which includes a filter unit installed at a terminal body at the front of a camera lens and classified into an infrared pass filter and an infrared cutoff filter, wherein a filter suitable for a photographing mode is selected by moving the filter unit right or left by means of clockwise/counterclockwise rotation of a motor having a lead screw shaft or moving the filter unit right or left while gripping a filter moving knob.

However, in Korean Unexamined Patent Publication No. 2006-0119077 (published on Nov. 24, 2006), the filter unit classified into an infrared pass filter and an infrared cutoff filter should be mounted separately to the terminal body, and a motor should be provided to automatically move the filter unit right and left. In other words, since the filter unit is not integrated with the camera module, the number of parts and assembling processes increases, and thus a communication terminal manufacturer cannot easily select the filter unit. In addition, in the current trends, the portable terminal gets thinner and thinner, the battery becomes larger and larger, and more diverse attachments are included in the portable terminal. Thus, it is substantially impossible to ensure a space for mounting a separate filter unit.

Heretofore, the necessity of an actuator for automatically selecting a suitable filter for iris recognition or general imaging has been described. In order to add other functions in addition to autofocusing, optical zooming and optical image stabilization to the camera module to follow the recent development trend of the portable terminal, these functions should be integrated with the camera module. However, if a VCM actuator or piezo-electric actuator broadly used in the art is applied to the existing camera module, the camera module has too large size to be applied to the portable terminal. In addition, the VCM actuator and the piezo-electric actuator need a conversion unit to give a rotation since they are basically used for giving a linear motion.

Therefore, there is a need to develop a rotational actuator for an optical device, which may give a rotation with a new structure without giving an influence on the size of the camera module.

SUMMARY

The present disclosure is directed to providing a rotational actuator for an optical device, which is integrally provided at a camera module mounted to a portable terminal and may give a rotation with a new structure without giving an influence on the size and power consumption of the camera module.

In one aspect of the present disclosure, there is provided a rotational actuator for an optical device, comprising: a rotary shaft capable of freely rotating at a fixed position; a first shape-memory alloy wire fixed in a first direction to give a rotation moment to the rotary shaft, the first shape-memory alloy wire making length contraction with respect to the rotary shaft when an electric current is applied thereto; a second shape-memory alloy wire fixed in a second direction opposite to the first direction to give a rotation moment with respect to the rotary shaft, the second shape-memory alloy wire making length contraction with respect to the rotary shaft when an electric current is applied thereto; and a control unit configured to supply an electric current to the first shape-memory alloy wire when rotating the rotary shaft in the first direction and supply an electric current to the second shape-memory alloy wire when rotating the rotary shaft in the second direction.

Here, the control unit may block power supply to the first shape-memory alloy wire or the second shape-memory alloy wire when the rotary shaft completely rotates in first direction or second direction.

In an embodiment of the present disclosure, the first shape-memory alloy wire and the second shape-memory alloy wire may be respectively made of a single shape-memory alloy wire and adhered to the rotary shaft at a boundary point of the first direction and the second direction, and the rotary shaft may be electrically connected to the single shape-memory alloy wire as a common negative electrode terminal, and first and second independent positive electrode terminals are respectively electrically connected to both ends of the single shape-memory alloy wire.

In other case, in another embodiment of the present disclosure, the first shape-memory alloy wire and the second shape-memory alloy wire may be respectively made of a single shape-memory alloy wire and wound on the rotary shaft by at least one turn, the rotary shaft may be electrically connected to the single shape-memory alloy wire as a common negative electrode terminal, and first and second independent positive electrode terminals may be respectively electrically connected to both ends of the single shape-memory alloy wire.

In addition, in still another embodiment of the present disclosure middle portions of the first shape-memory alloy wire and the second shape-memory alloy wire may be coupled to the rotary shaft to be capable of expanding or contracting so that both ends of each shape-memory alloy wire extend in the first direction and the second direction, respectively, and both ends of each shape-memory alloy wire may be electrically connected to a negative electrode terminal and first and second independent positive electrode terminals.

At this time, the negative electrode terminal to which one of both ends of each shape-memory alloy wire may be a single common negative electrode terminal.

In such various embodiments, a rotator fixed to the rotary shaft may be further provided.

Here, two filters having different characteristics as an optical window may be provided at the rotator.

The two filters may be respectively an infrared cutoff filter and an infrared pass filter.

Meanwhile, the rotational actuator for an optical device according to various embodiments as mentioned above may be loaded at a camera module.

In an embodiment, the rotational actuator for an optical device may be loaded on a surface of the camera module at which an opening is formed to allow light to pass to a lens assembly of the camera module.

Here, in the rotational actuator for an optical device, the rotary shaft may be installed at an edge of the camera module, and the first direction and the second direction may extend from the rotary shaft with an angle of 90°.

In addition, the surface at which the opening is formed may have a rectangular shape, and the first shape-memory alloy wire and the second shape-memory alloy wire may respectively extend along two edges of the rectangular surface.

Moreover, the camera module having an infrared cutoff filter and an infrared pass filter at the rotator may be used for iris recognition.

The rotational actuator for an optical device according to the present disclosure configured as above may rotate a rotary shaft in both directions just with a simple structure for adhering a thin shape-memory alloy wire to the rotary shaft and selectively supplying an electric current. Therefore, the rotational actuator may be very easily applied to a camera module included in a small portable terminal in an integrated form.

In addition, since the wire is prepared simply without processing a shape-memory alloy into a special shape and is just used to make length contraction by a resistance heat, it is possible to ensure very reliable operation.

Moreover, since the shape-memory alloy wire has a diameter of just several ten micrometers, a sufficient resistance heat may be generated just with a fine electric current. Therefore, the rotational actuator has low power consumption and thus is very suitable for a portable terminal which is sensitive to power control.

DETAILED DESCRIPTION

Figure 1A:
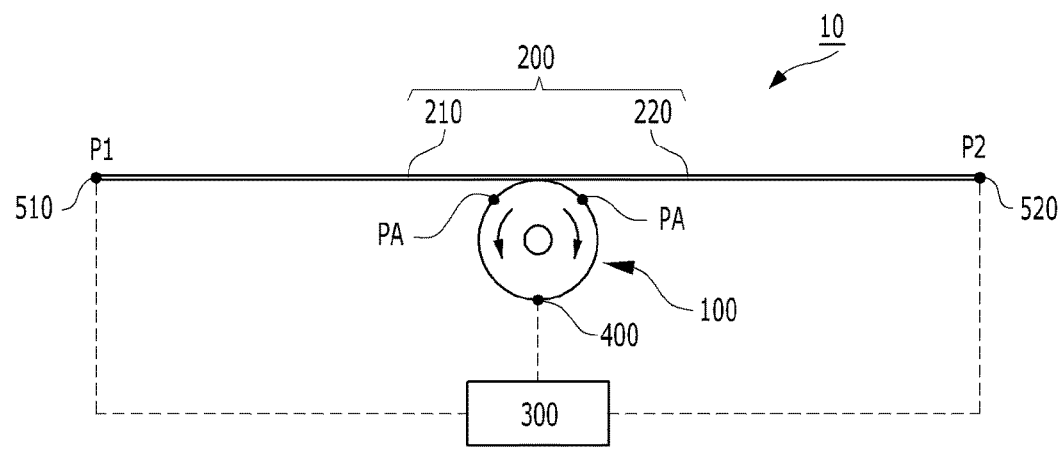
FIGS. 1A and 1B are diagrams showing a basic structure of a rotational actuator for an optical device according to the present disclosure to explain an operation principle thereof.

Hereinafter, embodiments of the present disclosure will be described in detail with reference to the accompanying drawings.

When describing the embodiments of the present disclosure, any known feature obviously understood by those skilled in the art will not be explained in detail in order to avoid ambiguity of the present disclosure. In addition, like reference symbols are donated to like elements though they are depicted in different drawings. Also, it should be understood that thickness of lines or sizes of components may be exaggerated in the drawings for better understanding and convenient explanation.

In addition, when describing components of the present disclosure, the terms such as "first", "second", "A", "B", "(a)", "(b)" or the like may be used. These terms are just used for distinguishing any component from another component and are not intended to limit essence, order, sequence or the like of the corresponding components. When it is described that any component is "connected", "coupled" or "united" to another component, the component may be directly connected, coupled or united to another component, but it is also possible that the component is be indirectly connected, coupled or united to another component in a state where further another component is interposed between them.

Figure 1B:
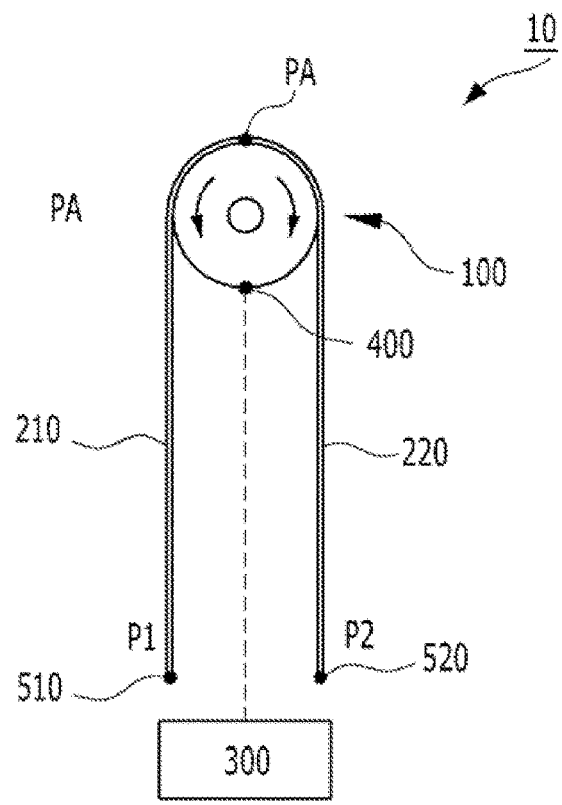

FIGS. 1A and 1B are diagrams showing a basic structure of a rotational actuator 10 for an optical device according to the present disclosure to explain an operation principle thereof. Therefore, the present disclosure is not limited to the structure of FIGS. 1A and 1B, but various embodiments will be described later.

The rotational actuator 10 for an optical device, shown in FIGS. 1A and 1B, includes a rotary shaft, a first shape-memory alloy wire 210, a second shape-memory alloy wire 220 and a control unit 300.

The rotary shaft may freely rotate at a fixed position, and a rotator 120, explained later, may be attached or integrated to the rotary shaft. In other words, by means of the rotation of the rotary shaft, the rotator 120 may be turned to a desired direction by a desired angle.

The first and second shape-memory alloy wires 210, 220 are used for rotating the rotary shaft to a desired direction and are made of a shape-memory alloy. Even though the shape-memory alloy is deformed by applying a force thereto, the shape-memory alloy restores to its original shape instantly by applying just a little heat thereto since it memorizes its original shape. At the present, a titanium-nickel alloy obtained by mixing titanium and nickel at a ratio of 1:1 and a copper-zinc-aluminum alloy containing 20 to 25% of zinc and 4 to 6% of aluminum are available in the market.

The first shape-memory alloy wire 210 is fixed in a first direction P1 to apply a rotation moment to the rotary shaft 100. In other words, one end of the first shape-memory alloy wire 210 is fixed at one point deviating from the rotation center of the rotary shaft 100, for example at a surface of the rotary shaft 100, so that a rotation moment is applied to the rotary shaft 100 as the length of the first shape-memory alloy wire 210 changes.

If an electric current is applied to the first shape-memory alloy wire 210, heat is generated by means of resistance. Due to the heat, the first shape-memory alloy wire 210 restores to its original shape from a deformed state, thereby making length contraction with respect to the rotary shaft 100. Based on FIGS. 1A and 1B, if an electric current is applied to the first shape-memory alloy wire 210 to make length contraction, the rotary shaft 100 rotates in a counterclockwise direction.

The second shape-memory alloy wire 220 is substantially identical to the first shape-memory alloy wire 210 in its basic configuration. However, the second shape-memory alloy wire 220 is fixed at a second direction P2 so that when making length contraction, the second shape-memory alloy wire 220 rotates the rotary shaft 100 in a direction opposite to the case where the first shape-memory alloy wire 210 makes length contraction. In other words, based on FIGS. 1A and 1B, if an electric current is applied to the second shape-memory alloy wire 220 to make length contraction, the rotary shaft 100 rotates in a clockwise direction.

Here, the first direction P1 and the second direction P2 are terms to indicate that the first and second shape-memory alloy wires 210, 220 make length contraction in opposite directions based on a direction in which a rotation moment is applied to the rotary shaft 100. In other words, the first direction P1 and the second direction P2 do not merely mean that the first and second shape-memory alloy wires 210, 220 simply extend in opposite directions.

In FIG. 1A, the first and second shape-memory alloy wires 210, 220 extend in opposite directions, but in FIG. 1B, the first and second shape-memory alloy wires 210, 220 extend in the same direction. In other words, the first direction P1 and the second direction P2 are determined according to both point of actions (PA) at which the first and second shape-memory alloy wires 210, 220 are fixed on the rotary shaft 100 and directions in which the first and second shape-memory alloy wires 210, 220 extend.

In addition, the length contraction of the first and second shape-memory alloy wires 210, 220 may cause a rotation moment to the rotary shaft 100 if one end of each of the shape-memory alloy wires 210, 220 is fixed to the rotary shaft 100 and the other end is fixed to any one point.

Here, the length contraction by resistance heat depends on strain rates and entire lengths of the first and second shape-memory alloy wires 210, 220. In other words, the absolute contraction length of each of the first and second shape-memory alloy wires 210, 220 is determined according to the entire length thereof and the contraction ratio caused by heat applied thereto.

In addition, an angle by which the rotary shaft 100 rotates in the first direction P1 or in the second direction P2 is determined according to the absolute contraction length of the first and second shape-memory alloy wires 210, 220 and a distance from the point of action (PA) to the rotation center. Therefore, the rotation angle of the rotary shaft 100 may be designed as desired by using three factors as above.

The control unit 300 may rotate the rotary shaft 100 in a desired direction by controlling an electric current applied to each of the first and second shape-memory alloy wires 210, 220. The control unit 300 supplies an electric current to the first shape-memory alloy wire 210 when rotating the rotary shaft 100 in the first direction P1 and supplies an electric current to the second shape-memory alloy wire 220 when rotating the rotary shaft 100 in the second direction P2.

In other words, the control unit 300 controls to apply an electric current to the first and second shape-memory alloy wires 210, 220, respectively, in order to apply a rotation moment in the first direction P1 and the second direction P2, and while applying an electric current to any one shape-memory alloy wire 210 or 220, the control unit 300 does not supply an electric current to the other of the shape-memory alloy wire 220 or 210.

Therefore, when any one shape-memory alloy wire 210 or 220 makes length contraction by resistance heat, the other shape-memory alloy wire 220 or 210 to which an electric current is not applied is deformed to expand due to the length contraction, the expanded shape-memory alloy wire 220 or 210 to which an electric current is not applied is prepared for next length contraction. Such expansion and contraction occurs alternately and oppositely at both shape-memory alloy wires 210, 220 when the rotary shaft 100 repeats rotation.

Here, if the rotary shaft 100 is completely rotated in the first direction P1 or the second direction P2, the control unit 300 may block the supply of electric current to the first shape-memory alloy wire 210 or the second shape-memory alloy wire 220. Accordingly, if the rotary shaft 100 rotated in one direction keeps the rotated state until an electric current is supplied to the second shape-memory alloy wire 220 or the first shape-memory alloy wire 210.

The rotational actuator 10 for an optical device according to the present disclosure has many advantages.

First, just with a simple structure for adhering the first and second thin shape-memory alloy wires 210, 220 to the rotary shaft 100 and supplying an electric current thereto, the rotary shaft 100 may be rotated in both directions. Therefore, the rotational actuator may be very easily applied to a camera module included in a small portable terminal in an integrated form.

In addition, since the wire is prepared simply without processing a shape-memory alloy into a special shape and is just used to make length contraction by a resistor heat, it is possible to ensure very reliable operation.

Moreover, since the shape-memory alloy wire 200 has a diameter of just several ten micrometers, a sufficient resistor heat may be generated just with a fine electric current. Therefore, the rotational actuator has low power consumption and thus is very suitable for a portable terminal which is sensitive to power control.

Figure 2:
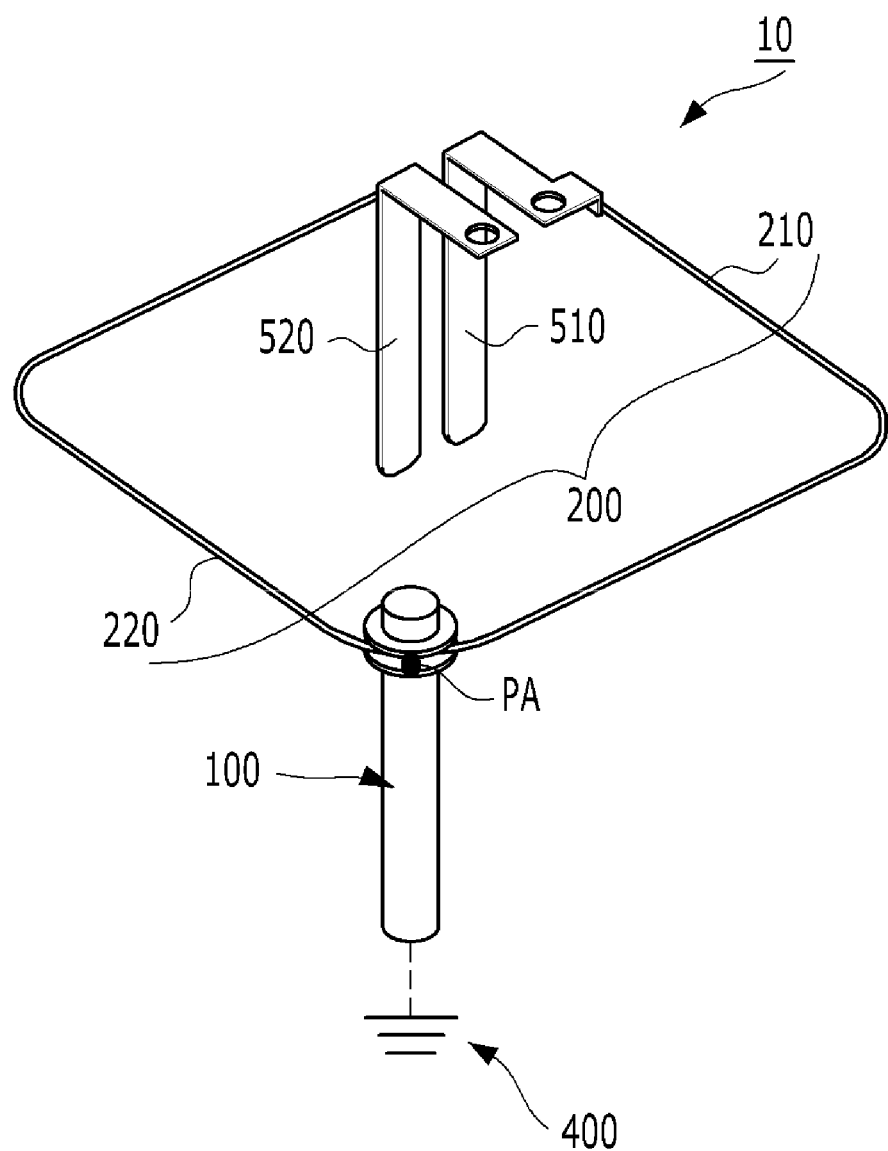
FIG. 2 is a diagram showing a rotational actuator for an optical device according to an embodiment of the present disclosure.

FIG. 2 is a diagram showing the rotational actuator 10 for an optical device according to an embodiment of the present disclosure, which operates based on the above principle. Here, the control unit 300 is not depicted in FIG. 2 as well as in FIGS. 3 and 4 explained later.

In the embodiment depicted in FIG. 2, the first shape-memory alloy wire 210 and the second shape-memory alloy wire 220 are made of a single shape-memory alloy wire 200, and are adhered to the rotary shaft 100 at a boundary point of the first direction P1 and the second direction P2. In other words, the shape-memory alloy wire 200 connected in a single wire is functionally separated or distinguished into the first shape-memory alloy wire 210 and the second shape-memory alloy wire 220 based on the point adhered to the rotary shaft 100.

In addition, the rotary shaft 100 is electrically connected to the first and second shape-memory alloy wires 210, 220 as a common negative electrode terminal (or, a ground terminal) 400, and independent positive electrode terminals 510, 520 are respectively electrically connected to both ends of the single shape-memory alloy wire 200. The electric currents applied to both ends of the single shape-memory alloy wire 200 are selectively supplied under the control of the control unit 300.

In the depicted embodiment, the first and second shape-memory alloy wires 210, 220 are made of the single shape-memory alloy wire 200, and the single shape-memory alloy wire 200 is adhered and electrically connected to the rotary shaft 100 serving as a common negative electrode terminal 400. Therefore, an electric current supplied to any one end of the shape-memory alloy wire 200 does not flow to the other side based on the point adhered to the rotary shaft 100.

Figure 3:
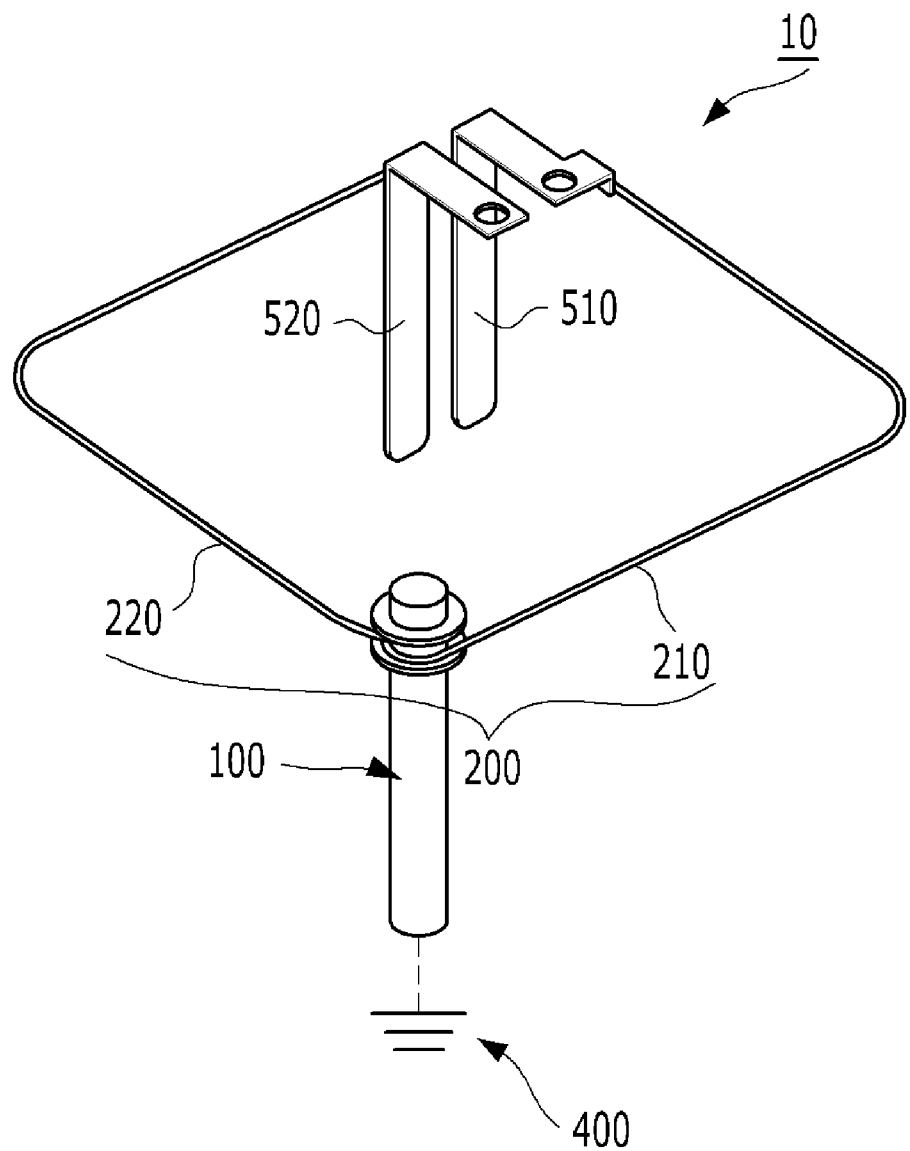
FIG. 3 is a diagram showing a rotational actuator for an optical device according to another embodiment of the present disclosure.

FIG. 3 is a diagram showing a rotational actuator 10 for an optical device according to another embodiment of the present disclosure.

The rotational actuator 10 for an optical device as shown in FIG. 3 is identical to the embodiment of FIG. 2 in the point that the first shape-memory alloy wire 210 and the second shape-memory alloy wire 220 are made of the single shape-memory alloy wire 200, but the shape-memory alloy wire 200 is not adhered to one point at the surface of the rotary shaft 100 but is wound at least one turn around the rotary shaft 100, different from the embodiment of FIG. 2.

In other words, instead of the configuration where the shape-memory alloy wire 200 is fixed to the rotary shaft 100 by means of welding or the like, in this embodiment, the shape-memory alloy wire 200 is wound around the rotary shaft 100 by at least one turn to ensure a sufficient frictional force so that the change of length of the shape-memory alloy wire 200 is converted into a rotational motion of the rotary shaft 100. A stress may be accumulated at the adhered portion of the shape-memory alloy wire 200 due to repeated operations of the rotary shaft 100, which may break the shape-memory alloy wire 200. The embodiment of FIG. 2 solves this problem and also allows the shape-memory alloy wire 200 to be conveniently coupled to the rotary shaft 100.

In addition, the rotary shaft 100 is electrically connected to the single shape-memory alloy wire 200 as a common negative electrode terminal 400, and first and second independent positive electrode terminals 510, 520 are respectively electrically connected to both ends of the single shape-memory alloy wire 200, identical to the former embodiment of FIG. 2.

Figure 4:
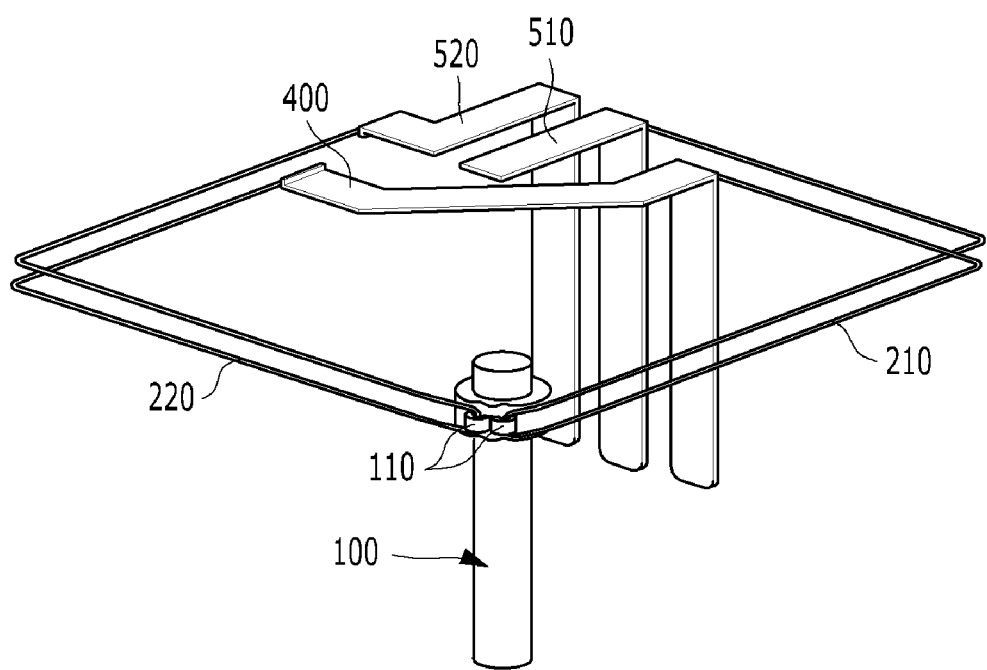
FIG. 4 is a diagram showing a rotational actuator for an optical device according to still another embodiment of the present disclosure.

FIG. 4 is a diagram showing a rotational actuator 10 for an optical device according to still another embodiment of the present disclosure.

In the embodiment of FIG. 4, the first shape-memory alloy wire 210 and the second shape-memory alloy wire 220 are made of separate shape-memory alloy wires physically divided from each other. Further, a middle portion of each of the shape-memory alloy wires 210, 220 is coupled to the rotary shaft 100 to be capable of expanding or contracting, and both ends of each of the shape-memory alloy wires 210, 220 extend in the first direction P1 and the second direction P2, respectively.

In other words, as shown in FIG. 4, two rings 110 are formed at a surface of the rotary shaft 100, and the first shape-memory alloy wire 210 and the second shape-memory alloy wire 220 are inserted into the rings 110, respectively. The rings 110 allow the first and second shape-memory alloy wires 210, 220 to give a rotation moment to the rotary shaft 100. The first and second shape-memory alloy wires 210, 220 are hooked by the rings 110 but not adhered (or, fixed) thereto, and thus the portions hooked at the rings 110 may also be expanded or contracted (or, change the length) without limitation.

Moreover, in the embodiment of FIG. 4, it is also important that both ends of each of the shape-memory alloy wires 210, 220 extend in the first direction P1 and the second direction P2. Since the positive electrode terminals 510, 520 and the negative electrode terminal 400 are respectively electrically connected to both ends of each of the shape-memory alloy wires 210, 220, the entire length of each of the shape-memory alloy wires 210, 220 increases about twice in comparison to the embodiments of FIGS. 2 and 3. As described above, the absolute length contracted by the resistance heat is determined depending on a strain rate and an entire length of the first and second shape-memory alloy wires 210, 220, and a rotation angle of the rotary shaft 100 is determined depending on an absolute contraction length of the first and second shape-memory alloy wires 210, 220 and a distance from the point of action (PA) to the rotation center. Therefore, in the embodiment of FIG. 4, the rotation angle of the rotary shaft 100 may be greatly increased within a limited narrow space.

Since the arrangements and fixed points of the first and second shape-memory alloy wires 210, 220 are different from those of the embodiments of FIGS. 2 and 4, the rotary shaft 100 may not be used as a common negative electrode. Therefore, both ends of each of the shape-memory alloy wires 210, 220 are electrically connected to the first and second positive electrode terminals 510, 520, independent from the negative electrode terminal 400. At this time, if any one of both ends of each of the shape-memory alloy wires 210, 220 is connected to the single common negative electrode terminal 400, the number of terminals may be reduced by one.

Figure 5:
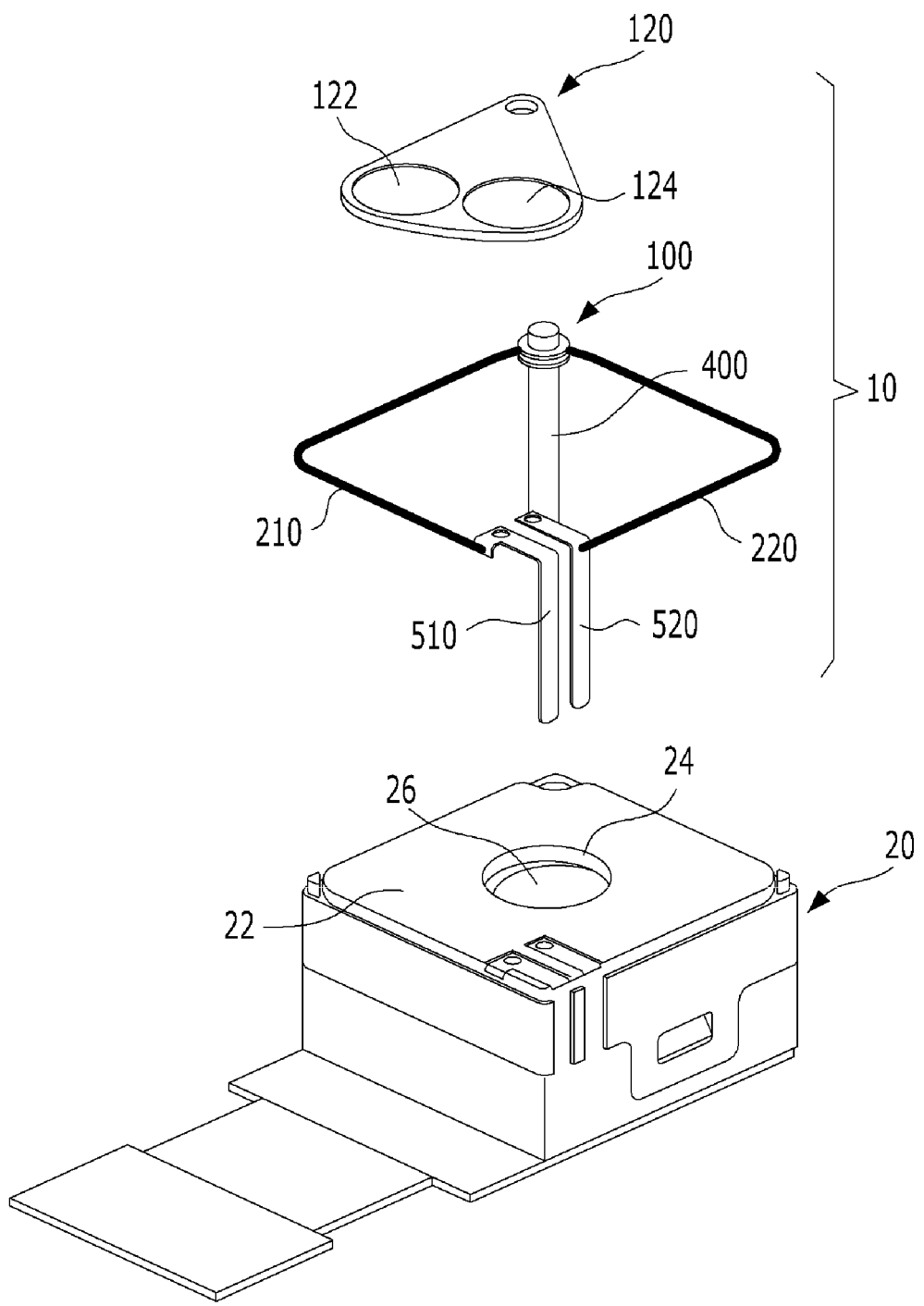
FIG. 5 is an exploded perspective view showing that the rotational actuator for an optical device is applied to a camera module according to an embodiment of the present disclosure.
Figure 6:
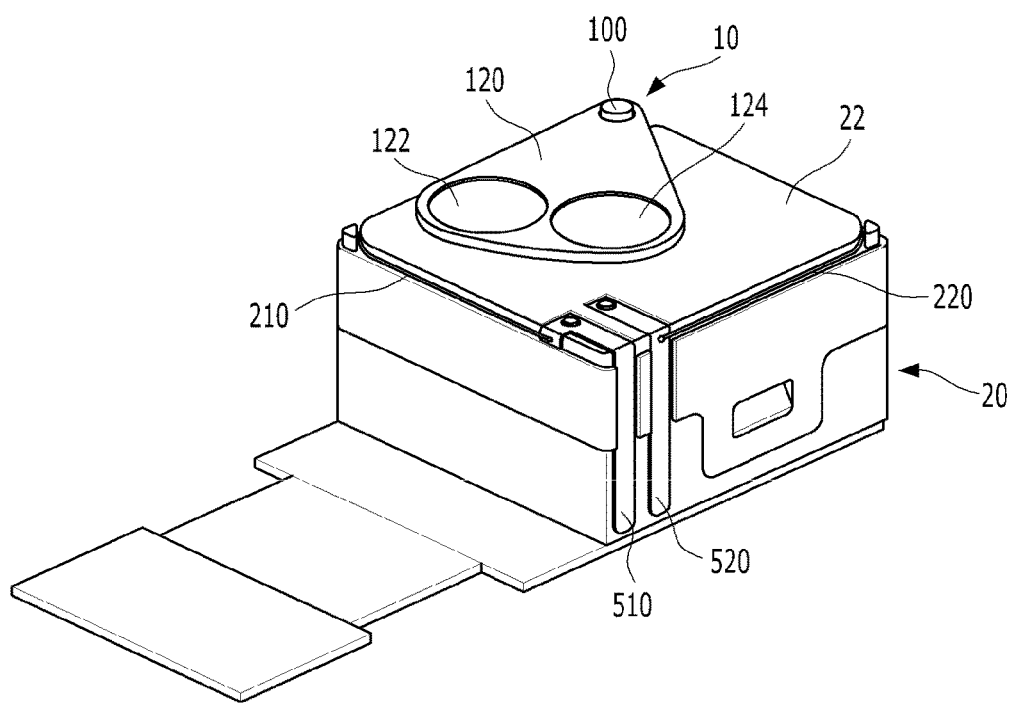
FIG. 6 is a perspective view showing that the rotational actuator for an optical device, depicted in FIG. 5, is coupled to the camera module.

FIG. 5 is an exploded perspective view showing that the rotational actuator 10 for an optical device is applied to a camera module 20 according to an embodiment of the present disclosure, and FIG. 6 is a perspective view showing that the rotational actuator 10 for an optical device, depicted in FIG. 5, is coupled to the camera module 20.

Here, the rotational actuator 10 for an optical device according to the embodiment of FIG. 2 is applied to the camera module 20 of FIGS. 5 and 6, but this is just an example, and it should be understood that the rotational actuator 10 for an optical device according to the embodiments of FIGS. 3 and 4 may also be applied thereto.

Referring to FIGS. 5 and 6, a rotator 120 is further provided at the rotary shaft 100 of the rotational actuator 10 for an optical device, described above. The rotator 120 is a portion moving together when the rotary shaft 100 moves (or, rotates), and the rotator 120 is used as a component for actually giving any optical effect to the camera module 20. The rotary shaft 100 and the rotator 120 may be prepared separately and the coupled to each other as shown in the figures or may also be integrally prepared as a single component.

One of optical effects given by the rotator 120 is a filtering function for adjusting a wavelength band of light put into a lens assembly (or, a lens barrel) 26 of the camera module 20. The rotator 120 having this function is provided with two filters having different characteristics as an optical window. In other words, any one of two filters provided at the rotator 120 may be arranged to block an opening 24 formed in a top cover 22 of the camera module 20 so that the wavelength band of light put into the lens assembly 26 of the camera module 20 is adjusted. A filter located at the front of the opening 24 of the top cover 22 is selected by rotating the rotary shaft 100, and in an actual implementation, a camera program (application) for controlling the camera module 20 and obtaining image data may send an instruction to the control unit 300 of the rotational actuator 10 for an optical device to automatically select a filter according to an imaging mode.

In an embodiment, two filters provided at the rotator 120 may be respectively an infrared cutoff filter 122 and an infrared pass filter 124. As a preparation for iris recognition (or, vein recognition) for user registration or authentication and general imaging, the rotator 120 may be controlled so that the infrared pass filter 124 for iris recognition (or, vein recognition) or the infrared cutoff filter 122 for general imaging is located at the front of the opening 24 of the top cover 22, thereby ensuring an optimal imaging result.

Though not shown in the figures, in another embodiment, holes with different diameters may be formed in the rotator 120, instead of providing filters to the rotator 120. The holes formed in the rotator 120 may serve as a kind of iris diaphragm. In other words, by providing an iris diaphragm adjusted into two stages to the camera module 20, the depth of field may be differently set. Since it is substantially not yet found that a physical iris diaphragm is provided at the camera module 20 loaded at a portable terminal, the rotational actuator 10 for an optical device according to the present disclosure may give a good solution thereto.

Meanwhile, FIGS. 5 and 6 show an embodiment in which the rotational actuator 10 for an optical device according to the present disclosure is loaded at the camera module 20.

As shown in the figures, the rotational actuator 10 for an optical device according to the present disclosure may be loaded on a surface of the camera module 20 in which the opening 24 is formed to allow light to move into the lens assembly 26, namely on the top cover 22. Since the rotational actuator 10 for an optical device according to the present disclosure is composed of just simple and small components, namely the first and second shape-memory alloy wires 210, 220 and the rotary shaft 100, the rotational actuator 10 may be applied to an existing camera module 20, whose design is already completed, without any great difficulty.

In other words, without changing the inner configuration of the camera module 20, the rotational actuator 10 of the present disclosure may be applied to an existing camera module 20 through a simple design change just by installing the first and second shape-memory alloy wires 210, 220 and the rotary shaft 100 on the top cover 22 and then connecting the positive electrode terminals 510, 520 and the negative electrode terminal (a ground terminal) 400 thereto to supply an electric current to the first and second shape-memory alloy wires 210, 220. In addition, the control unit 300 for operating the rotational actuator 10 for an optical device may be configured just by modifying programs of a control unit which is already provided at the camera module 20 or the portable terminal.

Here, in the rotational actuator 10 for an optical device, the rotary shaft 100 may be installed at an edge of the camera module 20, and the first direction P1 and the second direction P2 in which rotation moments are applied to the rotary shaft 100 oppositely may extend from the rotary shaft 100 with an angle of 90°. This is because the camera module 20 is mostly designed with a hexagonal shape in which the surface (the top cover) having the opening 24 has a rectangular shape.

In addition, in this arrangement, the first shape-memory alloy wire 210 and the second shape-memory alloy wire 220 may respectively extend along two edges of the rectangular shape of the top cover 22 to have sufficient lengths. This is because a sufficient angle for operating the rotator 120 may be ensured when the first and second shape-memory alloy wires 210, 220 are as long as possible.

The present disclosure has been described and illustrated in detail. However, it should be understood by those skilled in the art that the present disclosure can be modified in various ways within the scope of the present disclosure. Therefore, the scope of the present disclosure should be defined by the appended claims and their equivalents.

What is claimed is:

1. A rotational actuator for an optical device, comprising:
a rotary shaft capable of freely rotating at a fixed position;
a first shape-memory alloy wire fixed in a first direction to give a rotation moment to the rotary shaft, the first shape-memory alloy wire making length contraction with respect to the rotary shaft when an electric current is applied thereto;
a second shape-memory alloy wire fixed in a second direction opposite to the first direction to give a rotation moment with respect to the rotary shaft, the second shape-memory alloy wire making length contraction with respect to the rotary shaft when an electric current is applied thereto; and
a control unit configured to supply an electric current to the first shape-memory alloy wire when rotating the rotary shaft in the first direction and supply an electric current to the second shape-memory alloy wire when rotating the rotary shaft in the second direction.

2. The rotational actuator for an optical device according to claim 1, wherein the control unit blocks power supply to the first shape-memory alloy wire or the second shape-memory alloy wire when the rotary shaft completely rotates in first direction or second direction.

3. The rotational actuator for an optical device according to claim 1, wherein the first shape-memory alloy wire and the second shape-memory alloy wire are respectively made of a single shape-memory alloy wire and adhered to the rotary shaft at a boundary point of the first direction and the second direction; and
the rotary shaft is electrically connected to the single shape-memory alloy wire as a common negative electrode terminal, and first and second independent positive electrode terminals are respectively electrically connected to both ends of the single shape-memory alloy wire.

4. The rotational actuator for an optical device according to claim 1, wherein the first shape-memory alloy wire and the second shape-memory alloy wire are respectively made of a single shape-memory alloy wire and wound on the rotary shaft by at least one turn; and
the rotary shaft is electrically connected to the single shape-memory alloy wire as a common negative electrode terminal, and first and second independent positive electrode terminals are respectively electrically connected to both ends of the single shape-memory alloy wire.

5. The rotational actuator for an optical device according to claim 1, wherein middle portions of the first shape-memory alloy wire and the second shape-memory alloy wire are coupled to the rotary shaft to be capable of expanding or contracting so that both ends of each shape-memory alloy wire extend in the first direction and the second direction, respectively; and
both ends of each shape-memory alloy wire are electrically connected to a negative electrode terminal and first and second independent positive electrode terminals.

6. The rotational actuator for an optical device according to claim 5, wherein the negative electrode terminal to which one of both ends of each shape-memory alloy wire is connected is a single common negative electrode terminal.

7. The rotational actuator for an optical device according to claim 1, further comprising a rotator fixed to the rotary shaft.

8. The rotational actuator for an optical device according to claim 7, wherein two filters having different characteristics as an optical window are provided at the rotator.

9. The rotational actuator for an optical device according to claim 8, wherein the two filters are respectively an infrared cutoff filter and an infrared pass filter.

10. A camera module, at which the rotational actuator for an optical device defined in claim 1 is loaded.

11. The camera module according to claim 10, wherein the rotational actuator for an optical device is loaded on a surface of the camera module at which an opening is formed to allow light to pass to a lens assembly of the camera module.

12. The camera module according to claim 11, wherein the rotary shaft is installed at an edge of the camera module.

13. The camera module according to claim 12, wherein the first direction and the second direction extend from the rotary shaft with an angle of 90°.

14. The camera module according to claim 13, wherein the surface at which the opening is formed has a rectangular shape, and the first shape-memory alloy wire and the second shape-memory alloy wire respectively extend along two edges of the rectangular surface.

15. The camera module according to claim 10, wherein the camera module having an infrared cutoff filter and an infrared pass filter at the rotator is used for iris recognition.

* * * * *